Figure 1:
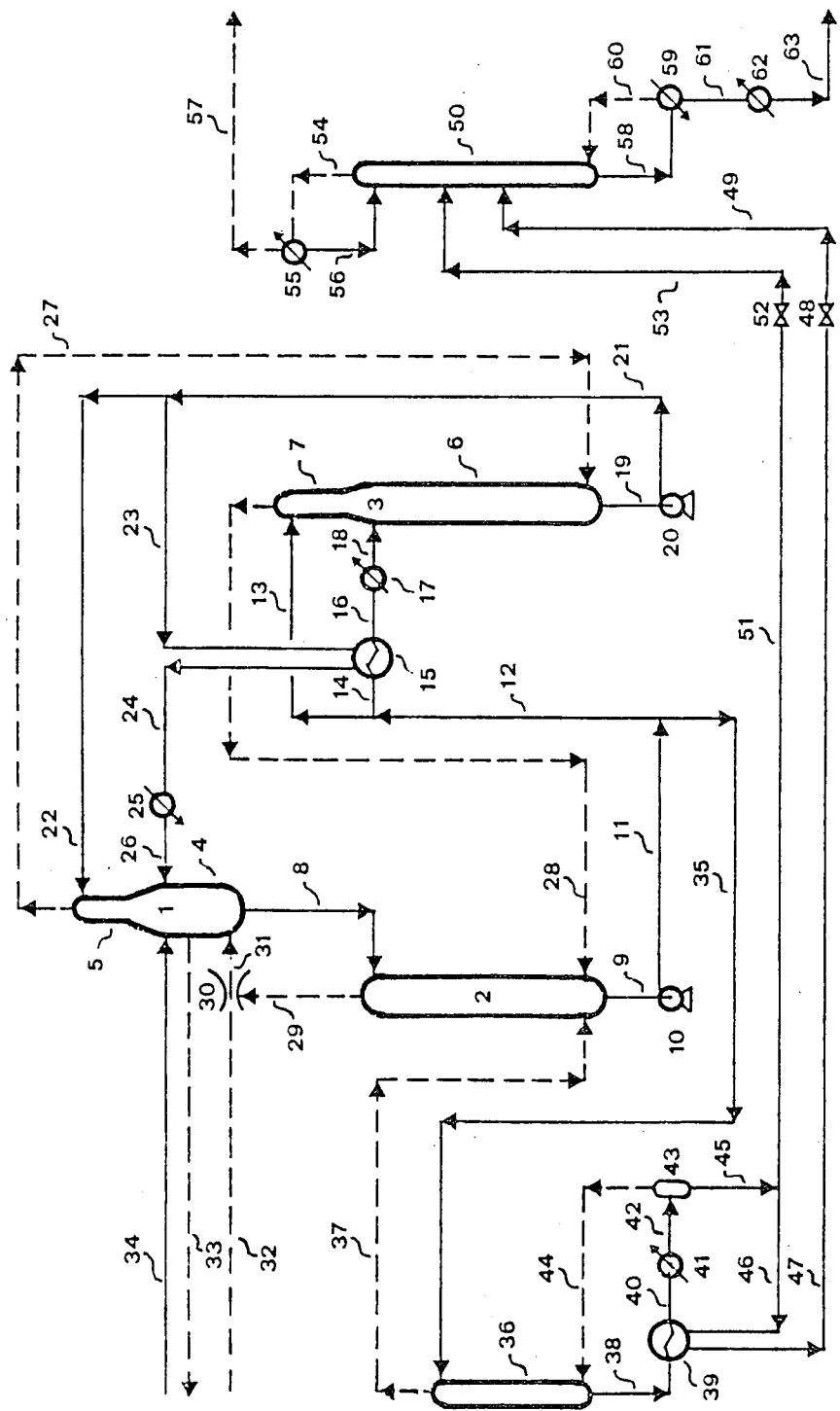

United States Patent [19]

Silberring

[11] 4,441,895

[45] Apr. 10, 1984

[54] PROCESS FOR THE SEPARATION OF MIXTURES BY MEANS OF MASS TRANSFER AT DIFFERENT TEMPERATURES OR PRESSURES

[76] Inventor: Ludwig Silberring, Limmattalstrasse 266, Zürich, Switzerland

[21] Appl. No.: 328,576

[22] PCT Filed: Apr. 13, 1981

[86] PCT No.: PCT/CH81/00041
§ 371 Date: Dec. 11, 1981
§ 102(e) Date: Dec. 11, 1981

[87] PCT Pub. No.: WO81/02985
PCT Pub. Date: Oct. 29, 1981

[51] Int. Cl.³ .............................................. C01C 1/10
[52] U.S. Cl. .................................... 55/70; 62/17; 62/20; 423/359
[58] Field of Search .............. 62/17, 20, 27, 28, 11, 62/19, 23, 24, 42, 43; 55/70, 36, 38; 423/359

[56] References Cited

U.S. PATENT DOCUMENTS 4,060,591 11/1977 Garber et al. ........................... 55/70

Primary Examiner—Frank Sever
Attorney, Agent, or Firm—Weingarten, Schurgin, Gagnebin & Hayes

[57] ABSTRACT

The invention relates to a process for the separation of material mixtures by means of mass transfer of different phases, which at least partly circulate in countercurrent in a closed circuit in which part of the mass transfer devices are operated at a higher temperature or pressure and another part thereof are operated at a lower temperature or pressure. The separating effects are achieved in that at least one third of one of the components of the mixtures also changes phase state with respect to the particular temperature or pressure change.

The process is particularly suitable for the separation of methane and argon from the synthesis circuit of an ammonia plant. The otherwise conventional hydrogen and ammonia are largely avoided. The process requires neither compressors nor high pressure pumps nor low-temperature devices.

5 Claims, 1 Drawing Figure

PROCESS FOR THE SEPARATION OF MIXTURES BY MEANS OF MASS TRANSFER AT DIFFERENT TEMPERATURES OR PRESSURES

The invention relates to a process for the separation of mixtures, which in different phase states circulate in countercurrent and at least partly in a closed circuit. A mass transfer takes place between the two mixtures and the separating effect is caused by a partial change of the phase state of at least one of the components to be separated.

Dual-temperature processes are known in which the mass flow rate of both circulating substances, apart from any superimposed flows in the closed circuit remains almost constant. Such processes may well be suitable for separation if the mass transfer is accompanied by chemical reactions and if the temperature dependence of the equilibrium constants of these reactions causes adequate separating effects. However, in general only a limited separating effect can be produced by means of absorption or adsorption exchange without chemical reactions and without any phase transition with respect to the temperature change.

In addition, dual-temperature or dual-pressure processes are known in which the circuit of at least one phase of the circulating mixture is not closed. For example a gaseous component is absorbed in a liquid and then this gaseous component is driven out of the liquid by means of a different gas, by means of its own vapour or by reducing the pressure. However, these processes are relatively unsuitable for the separation of valuable substances, whose losses must be limited to the maximum. It is also impossible to drive out the absorbed gaseous component from the liquid by means of its own vapour at supercritical pressure.

In the separating process according to the invention the separating problem is solved in that the mixtures to be separated in two different phase states circulate in countercurrent at least partly in a closed circuit in which part of the mass transfer devices operate at a higher temperature or a higher pressure and another part of these devices operate at a lower temperature or a lower pressure, the separating effects being caused through at least one third of one of the components of the mixture also changing the phase state with respect to the particular temperature or pressure change. There is also a reversal of the flow direction of that part of the mass flow, which changes the phase state. Therefore this part of the mass flow will recirculate in a part of the said circuit between the two temperature or pressure change points, so that a vital prerequisite for a good separating effect is obtained.

If one of the mixtures circulating in said circuit in liquid and the other gaseous, known mass transfer devices can be used, e.g. columns with plates or packings. However, one mixture can also be in the solid phase state. According to the invention the process is then performed in such a way that the relative circulation of said mixture with respect to the second, fluid mixture takes place either by means of fluidized beds of existing contact devices or by means of suitable periodic reversals of the flow paths of said fluid mixture through immobile layers of said mixture in the solid phase state.

The process described in general terms hereinbefore is particularly suitable for improving ammonia production. Ammonia is produced from a synthesis gas consisting of hydrogen, nitrogen and small amounts of methane and inert gases, the latter being mainly argon. Both methane and inert gases are enriched in the synthesis circuit of an ammonia plant and must be removed from it. Part of these gases is dissolved in the ammonia product flow and is conventionally removed together with the latter. In addition, normally part of the synthesis gas is drained off from the synthesis circuit in order to reduce the methane and argon proportions therein. This leads to losses of this valuable synthesis gas and the already synthesized ammonia.

Processes are already known for the separation of methane and argon from the synthesis circuit by means of low-temperature rectification. The main disadvantage of these processes is that the rectification process must take place below the critical pressure of the gases to be separated. The hydrogen and nitrogen recovered from the separation process must then be recompressed to the conventionally high ammonia synthesis pressure, for which expensive compressors and a great deal of energy is required.

Processes are also known for the separation of methane and argon from the synthesis circuit by means of selective absorption in liquid ammonia. In these known processes either, as in the low-temperature processes, high pressure compressors are required, or equally expensive high pressure pumps, also requiring a large amount of energy are used or only limited separating effects are achieved.

Adequate separation without the aforementioned disadvantages can be achieved according to the invention by means of a temperature difference in the closed circuit. According to the invention this problem is solved in that in said closed circuit the liquid ammonia, together with the gases dissolved therein, is circulated in countercurrent to the ammonia synthesis gas and that in this way the methane or argon or the two last-mentioned gases are separated from the synthesis circuit of an ammonia synthesis plant.

The separating effects of a single dual-temperature stage are adequate for conventional operating conditions. However, it is also possible to link several such stages in series and thereby achieve a random separating effect. It is also possible to cyclically operate one or more series-connected stages in such a way that methane and argon can be separately separated from the synthesis circuit with a single plant. During each cycle the appropriate ratio of the liquid flow to the gas flow is regulated in said closed circuit.

By means of suitable charging of the ammonia product flow the size of the separating plant can be reduced and the separating effects increased. According to the invention this is achieved in that the ammonia product flow obtained in said ammonia synthesis plant is superimposed on the ammonia circulating in said closed circuit in the vicinity of the hotter column, and that in this way the gases to be separated are removed in dissolved form, together with the ammonia product flow from the closed circuit.

According to the invention a further increase in the separating effects can be achieved in that the ammonia product flow enriched with dissolved methane and argon in the said closed circuit is supplied to the top of a further, single column, at whose bottom part of the dissolved gases is driven out from the solution by means of cooling and then flows back through the said further column to the closed circuit in countercurrent to the ammonia product flow.

The ammonia product flow to be supplied is conventionally expanded to a much lower pressure than that prevailing in the synthesis circuit. Most of the dissolved gases thereby escape from the liquid. However, it is also advantageous to separate the remaining part of the dissolved gases. According to the invention this is achieved in that after removal from said individual columns and after expansion to subcritical pressure, said ammonia product flow undergoes rectification in order to bring about an almost complete separation of the dissolved gases.

The invention will now be described by means of the example shown in FIG. 1. In FIG. 1 the liquid flows are represented by continuous lines and the gaseous flows by dotted lines.

The closed circuit substantially comprises columns 1, 2, and 3. The liquid ammonia flows through these columns in the indicated order and the ammonia synthesis gas in countercurrent thereto. This circuit is operated at the same pressure as the synthesis circuit of the ammonia plant, at 300 bar in the present example. The temperature in the lower part 4 of column 1 and in column 2 is 336 K. However, the lower part 6 of column 3 is operated at a temperature of 270 K. The upper part 5 of column 1 and the upper part 7 of column 3 are used for approximating the gaseous temperature to the value prevailing in the next-connected column on the gas side. This is brought about by heat exchange in contact devices with a partial flow of the liquid, emanating from the said next-connected column on the gas side.

The liquid ammonia with the dissolved gases in particular flows through line 8 from column 1 to column 2. In column 2 the liquid ammonia is enriched with dissolved methane and argon by the mass transfer with the gas flowing in countercurrent and at the same time depleted with respect to the dissolved hydrogen and nitrogen. The liquid then flows through line 9, circulating pump 10 and lines 11 and 12. Part of the liquid is then supplied through line 13 to the upper part 7 of column 3. The remainder flows through line 14, the pipe side of recuperator 15, line 16, condenser 17 and line 18 to the lower part 6 of column 3. The liquid is cooled to a temperature of 268 K in recuperator 15 and condenser 18. Simultaneously a large part of the dissolved gases is driven out of the liquid solution, because the solubility of these gases in the liquid ammonia also drops drops with the decreasing temperature. After entering column 3 the expelled gases flow upwards through the upper part 7 of said column, together with the gaseous flow from the lower part 6.

In part 6 of column 3 the methane and argon previously enriched in the liquid ammonia are depleted again by the mass transfer with the gas flowing in countercurrent, whereas the hydrogen and nitrogen in the liquid solution are enriched.

The liquid from column 3 again flows through line 19, circulating pump 20 and line 21. Part of this liquid is then supplied through line 22 to the upper part 5 of column 1. However, the remainder flows through line 23, the casing side of recuperator 15, line 24, preheater 25 and line 26 to the lower part 4 of column 1. The liquid is preheated to a temperature of 363 K in recuperator 15 and preheater 25, so that it is able to absorb a large part of the gas flowing through the lower part 4 of column 1.

In part 4 of column 1 the methane and argon are enriched in the liquid solution in the same way as in the remaining columns and the hydrogen and nitrogen are depleted.

As stated hereinbefore the gas flows in closed circuit in countercurrent to the liquid and specifically through line 27 from column 1 to column 3, then through line 28 to column 2, through line 29 to the annular space of ejector 30 and finally through line 31 back to column 1. In addition, line 32 supplies the ejector nozzle with fresh synthesis gas from the ammonia synthesis plant, whilst the synthesis gas depleted of methane and argon is returned through line 33 to the same ammonia synthesis plant at a point where the pressure is somewhat lower. Ejector 30 is used for driving the gas flow in the closed circuit. The pressure drop between lines 32 and 33 does not exceed 1 bar.

The ammonia product flow is superimposed on the said closed liquid circuit. This product flow is supplied from the ammonia synthesis plant through line 34 to column 1. In the same way any difference in the ammonia vapour content of the gaseous flows passing through lines 32 and 33 is compensated.

The ammonia product flow enriched with methane and argon is removed from the closed circuit by line 35 and supplied to a further, single column 36. This column is operated at a pressure of 300 bar and a temperature of 336 K. The gas from the head of column 36 returns through line 37 to column 2, whereas the liquid leaves this column through line 38 and flows through the pipe side of recuperator 39, line 40, condenser 41 and line 42 to separator 43. The gases cooled to a temperature of 270 K, which are driven out of the liquid solution are separated from the liquid in separator 43 and returned through line 44 to column 36. The mass transfer between the outflowing liquid and the inflowing gas, which has been driven out of the same liquid, leads to a further enrichment of the liquid with methane and argon and to a depletion of hydrogen and nitrogen. The liquid leaving the separator 43 through line 45 contains all the methane and argon to be separated from the ammonia synthesis plant, as well as very small amounts of nitrogen and hydrogen.

Part of the liquid then flows through line 46, the casing part of recuperator 39, line 47, throttle valve 48 and line 49 to rectifying column 50. This part of the liquid is preheated in recuperator 39 to a temperature of 332 K. The remainder of the liquid from line 45 flows through line 51, throttle valve 52 and line 53 to rectifying column 50, but to a higher point thereof. This last-mentioned part of the liquid is used for condensing part of the ammonia vapours in rectifying column 50. The pressure is throttled from 300 to 30 bar in throttle valves 48 and 52. The following process stages are operated at the last-mentioned pressure.

The gas is taken from the head of rectifying column 50 through line 54 and is supplied to condenser 55. In the latter the mixture is cooled to a temperature of 250 K. The ammonia vapours which are then condensed are returned through line 56 to rectifying column 50. The methane and argon with small amounts of nitrogen, hydrogen and ammonia are supplied through line 57 and a pressure of 30 bar and a temperature of 250 K.

The liquid ammonia is removed at the bottom of rectifying column 50 by line 58. Part of the ammonia is evaporated in boiler 59 and returned through line 60 to rectifyiing column 50. The gas-free ammonia product flow flows through line 61 to condenser 62 and after cooling is supplied through line 63.

The aforementioned separating process can for example, be connected to an ammonia plant for producing 1000 t/day. The states and flow rates at the important points are summarized for this case in Table 1.

A further separation of the gases supplied through line 57 can preferably take place by means of the known low-temperature process. The hydrogen proportion contained in these gases is so small that it can be discarded and need not be recompressed to the ammonia synthesis pressure.

In addition to the aforementioned gases, the ammonia synthesis gas sometimes contains helium. The latter is not removed by means of the described process and instead the helium losses which otherwise occur are avoided. Therefore in the synthesis circuit the helium can be enriched to a higher level than is otherwise the case and can be removed either through a small outlet or can be separated by means of one of the known processes and obtained in an adequately pure form.

On the basis of the information given herein, Experts can obviously work out a number of further uses for the presently described invention.

TABLE 1

| Line | Pressure bar | Temperature K. | Phase (liquid L gas G) | Flow rate mol/s $NH_3$ | $CH_4$ | Ar | $N_2$ | $H_2$ |
|---|---|---|---|---|---|---|---|---|
| 32 | 300.9 | 300 | G | 29.3 | 32.4 | 30.0 | 86.6 | 259.8 |
| 33 | 300.3 | 336 | G | 88.6 | 28.4 | 29.2 | 87.2 | 266.5 |
| 34 | 300.3 | 300 | L | 739.3 | 8.0 | 3.3 | 5.2 | 9.5 |
| 57 | 30.0 | 250 | G | 1.5 | 12.0 | 4.1 | 4.6 | 2.8 |
| 63 | 30.0 | 300 | L | 678.5 | — | — | — | — |
| 8 | 300.0 | 336 | L | 3117.2 | 48.1 | 20.2 | 40.2 | 73.2 |
| 29 | 300.0 | 336 | G | 48.4 | 17.4 | 17.6 | 51.1 | 139.2 |
| 9 | 300.1 | 336 | L | 3120.8 | 64.5 | 28.8 | 42.9 | 65.6 |
| 28 | 300.1 | 332 | G | 52.0 | 33.8 | 26.2 | 53.8 | 131.7 |
| 19 | 300.2 | 270 | L | 2392.3 | 34.0 | 6.2 | 8.3 | 17.2 |
| 27 | 300.2 | 282 | G | 3.5 | 15.4 | 7.7 | 23.8 | 86.0 |
| 35 | 300.1 | 336 | L | 684.4 | 14.1 | 6.3 | 9.4 | 14.4 |
| 37 | 300.1 | 336 | G | 4.4 | 2.1 | 2.2 | 4.8 | 11.6 |
| 38 | 300.2 | 336 | L | 684.7 | 14.7 | 6.9 | 11.5 | 12.8 |
| 44 | 300.2 | 226 | G | 4.7 | 2.7 | 2.8 | 6.9 | 10.0 |

I claim:

1. A process for the selective ab-respectively desorption of gaseous syngas components in, respectively out of liquid ammonia, comprising:
    providing a closed circuit for the flow of two mass streams each of one or more components;
    providing a first reaction chamber having first and second physically separated input ports and first and second physically separated output ports;
    applying two input mass streams in different respective phases within said closed circuit to said reaction chamber at respective ones of said first and second reaction chamber input ports to produce counter current flow of one input mass stream with respect to the other input mass stream within a region of said reaction chamber;
    withdrawing two output mass streams in different respective phases from respective ones of said first and second output ports subsequent to the counter current flow of said phases;
    maintaining a temperature or pressure gradient within said reaction chamber sufficient to cause at least one third of at least one component of each input mass stream to change its phase in the region of counter current flow thereby producing said output mass streams each differing in content from the input mass stream of the corresponding phase.

2. The process of claim 1 adapted for the separation of methane and argon from ammonia synthesis gas wherein:
    said gradient is a temperature gradient;
    the first of said two input mass streams includes ammonia synthesis gas composed of hydrogen, nitrogen, argon, methane, and ammonia vapor;
    the second of said two input mass streams includes liquid ammonia containing dissolved hydrogen, nitrogen, argon, and methane; and
    a nearly constant pressure is maintained within said closed circuit whereby the separation is caused by the differences in solubilities of said gases in said liquid ammonia, and by the different solubilities of said gases at the different temperatures in the temperature gradient.

3. The process of claim 2, further comprising the steps of:
    providing a third input mass stream composed of liquid ammonia with dissolved synthesis gas;
    providing a third physically separated input port to said reaction chamber;
    merging said third input mass stream with said second input mass stream at a point upstream said temperature gradient in said second stream;
    withdrawing a fourth mass stream as a liquid phase enriched in dissolved methane and argon, downstream of said temperature gradient in said second stream, through said first output port;
    withdrawing a fifth mass stream as a gaseous phase, upstream of said temperature gradient in said second stream, through said second output port.

4. The process of claim 3, further comprising the steps of:
    providing a second closed circuit;
    providing a second reaction chamber within said second closed circuit; said second reaction chamber having first and second physically separated input ports and first and second physically separated output ports and a region of counter current flow therebetween;
    applying said fourth mass stream to said second reaction chamberthrough the first input port thereof;
    cooling of a liquid ammonia product from an output port of said second reaction chamber to provide a fifth mass stream;
    applying said fifth mass stream to said second reaction chamber through the second input port thereof, in countercurrent flow with said fourth mass stream;

receiving a gaseous mass stream in said second reaction chamber, from a further output port of said second reaction chamber for application to an input port of said first reaction chamber whereby said fourth liquid mass stream is depleted in dissolved hydrogen and nitrogen.

5. The process of claim 1, wherein:

one of the mass streams withdrawn from said second reaction chamber consists mainly of liquid ammonia, enriched in methand and argon gas; and wherein nitrogen and hydrogen in said withdrawn liquid mass stream consists mainly in the form of syngas.

* * * * *